(12) United States Patent
Share et al.

(10) Patent No.: US 8,758,644 B2
(45) Date of Patent: *Jun. 24, 2014

(54) OXYGEN-SCAVENGING MATERIALS AND ARTICLES FORMED THEREFROM

(75) Inventors: Paul Share, Wexford, PA (US); Jeffrey Niederst, Leechburgh, PA (US); Richard H. Evans, Wexford, PA (US); Grant Schutte, Pittsburgh, PA (US)

(73) Assignee: Valspar Sourcing, Inc., Minneapolis, MN (US)

( * ) Notice: Subject to any disclaimer, the term of this patent is extended or adjusted under 35 U.S.C. 154(b) by 187 days.

This patent is subject to a terminal disclaimer.

(21) Appl. No.: 12/594,909

(22) PCT Filed: Apr. 7, 2008

(86) PCT No.: PCT/US2008/059562
§ 371 (c)(1),
(2), (4) Date: Oct. 6, 2009

(87) PCT Pub. No.: WO2008/124682
PCT Pub. Date: Oct. 16, 2008

(65) Prior Publication Data
US 2010/0051862 A1    Mar. 4, 2010

Related U.S. Application Data

(60) Provisional application No. 60/910,866, filed on Apr. 10, 2007, provisional application No. 60/922,626, filed on Dec. 5, 2007.

(51) Int. Cl.
*C01B 3/00* (2006.01)
*C01B 6/00* (2006.01)
*C02F 1/70* (2006.01)
*C06B 23/00* (2006.01)
*C06B 43/00* (2006.01)
*C09K 3/00* (2006.01)
*C08G 63/54* (2006.01)
*C08G 63/02* (2006.01)
*C08G 63/18* (2006.01)

(52) U.S. Cl.
USPC ............. 252/188.28; 528/295.5; 528/298

(58) Field of Classification Search
CPC ........... C08G 63/553; C08K 2201/012; B65D 81/266; B32B 27/42
USPC .......................... 252/188.28; 528/295.3, 298
See application file for complete search history.

(56) References Cited

U.S. PATENT DOCUMENTS

| | | | |
|---|---|---|---|
| 1,969,709 A * | 8/1934 | Bruson et al. | 106/222 |
| 4,075,143 A * | 2/1978 | Schelhaas et al. | 524/47 |
| 5,021,515 A | 6/1991 | Cochran et al. | |
| 5,211,875 A | 5/1993 | Speer et al. | |
| 5,324,350 A * | 6/1994 | Bender et al. | 528/272 |
| 5,346,644 A | 9/1994 | Speer et al. | |
| 5,350,622 A * | 9/1994 | Speer et al. | 428/215 |
| 5,399,289 A | 3/1995 | Speer et al. | |
| 5,977,212 A * | 11/1999 | Ebner et al. | 523/210 |
| 6,083,585 A * | 7/2000 | Cahill et al. | 428/35.7 |
| 6,254,804 B1 | 7/2001 | Matthews et al. | |
| 6,255,248 B1 | 7/2001 | Bansleben et al. | |
| 6,410,156 B1 | 6/2002 | Akkapeddi et al. | |
| 6,515,067 B2 | 2/2003 | Cai et al. | |
| 6,525,123 B1 | 2/2003 | Yang et al. | |
| 6,559,205 B2 | 5/2003 | Cai et al. | |
| 6,777,496 B2 | 8/2004 | Patel et al. | |
| 6,818,151 B2 | 11/2004 | Yang et al. | |
| 6,878,774 B2 | 4/2005 | Kikuchi et al. | |
| 6,946,175 B2 | 9/2005 | Yang et al. | |
| 7,238,300 B2 | 7/2007 | Solis et al. | |
| 7,247,390 B1 | 7/2007 | Yang et al. | |
| 7,390,569 B2 | 6/2008 | Kitano et al. | |
| 2002/0072476 A1 | 6/2002 | Yoshida et al. | |
| 2003/0036486 A1 | 2/2003 | Kodali | |
| 2003/0152727 A1 | 8/2003 | Jerdee et al. | |
| 2003/0218152 A1* | 11/2003 | Yang et al. | 252/399 |
| 2005/0085577 A1 | 4/2005 | Ching et al. | |
| 2005/0104033 A1* | 5/2005 | Schmidt et al. | 252/181.1 |
| 2006/0202161 A1 | 9/2006 | Share et al. | |
| 2006/0276368 A1 | 12/2006 | Speer et al. | |
| 2008/0090042 A1 | 4/2008 | Kitahara | |
| 2008/0154002 A1* | 6/2008 | Nava et al. | 526/236 |
| 2009/0014687 A1* | 1/2009 | Kaskel et al. | 252/301.36 |

FOREIGN PATENT DOCUMENTS

| | | | | |
|---|---|---|---|---|
| EP | 1553137 A1 | 7/2005 | | |
| EP | 1666925 B1 | 3/2007 | | |
| JP | 04063810 A | 2/1992 | | |
| JP | 2001031759 A * | 2/2001 | ............ | C08G 69/00 |
| JP | 2001-072115 A | 3/2001 | | |

(Continued)

OTHER PUBLICATIONS

International Search Report and Written Opinion for PCT/US2008/059562 dated Jun. 23, 2008 (16 pgs).

(Continued)

*Primary Examiner* — Harold Pyon
*Assistant Examiner* — Tanisha Diggs

(57) ABSTRACT

An oxygen-scavenging component and methods for producing the oxygen-scavenging component are provided. The oxygen-scavenging component, which in preferred embodiments is suitable for use in packaging articles, includes an oxygen-scavenging group preferably having at least one double bond. The oxygen-scavenging component may be combined with a polymer and/or an oxidation catalyst to form an oxygen-scavenging composition.

22 Claims, No Drawings

(56) References Cited

FOREIGN PATENT DOCUMENTS

| | | | | |
|---|---|---|---|---|
| JP | 2001042115 A | | 3/2001 | |
| JP | 2001072115 A | * | 3/2001 | ............ B65D 53/00 |
| JP | 2005008699 A | | 1/2005 | |
| JP | 2006206744 A | | 8/2006 | |
| WO | WO 2005/037925 | * | 4/2005 | |

OTHER PUBLICATIONS

International Search Report and Written Opinion for PCT/US2008/079618 dated Dec. 15, 2008 (7 pgs).
International Search Report and Written Opinion for PCT/US2008/079532 dated Dec. 2008 (8 pgs).

* cited by examiner

OXYGEN-SCAVENGING MATERIALS AND ARTICLES FORMED THEREFROM

CROSS REFERENCE TO RELATED APPLICATION

This application is the National Stage filing under 35 U.S.C. 371 of International Application No. PCT/US2008/059562 filed Apr. 7, 2008, which claims the benefit of Provisional Application No. 60/910,866 filed on Apr. 10, 2007 and Provisional Application No. 60/992,626 filed on Dec. 5, 2007, all of which are incorporated herein by reference in their entirety.

TECHNICAL FIELD

This invention relates to oxygen-scavenging materials. More specifically, the invention relates to oxygen-scavenging materials suitable for use in packaging articles.

BACKGROUND

Historically, oxygen-sensitive products have been packaged and shipped in either glass or metal containers for delivery to the consumer. These containers have essentially zero gas permeability and, as such, the oxygen-sensitive products are able to remain fresh for an extended period of time.

There is a growing desire to package certain products such as, for example, foods and beverage products, in various plastic (e.g., PET, HDPE, PP, etc.) containers, wrapping, and other packaging articles. Compared to glass or metal packaging, plastic packaging is typically cheaper, more resistant to breakage, and more flexible (if desired). Conventional plastics, however, have generally functioned poorly at blocking oxygen passage relative to other available materials, such as glass or metal. The permeability of conventional plastics to oxygen transmission can result in short product shelf life, especially for products that are sensitive to degradation when exposed to oxygen.

Oxygen-scavenging materials have been incorporated into plastic containers in an attempt to maintain a low level of oxygen within the container, thereby extending the shelf life of the product. These plastic containers, however, have typically suffered from one or more deficiencies such as loss of adhesion, delamination, presence of off tastes or odors in products packaged therein, poor clarity, cost (e.g., material, storage, and/or transportation costs), insufficient oxygen-scavenging capacity and/or shelf life, and inefficient or untimely activation of oxygen scavenging.

Thus, there is a continuing need for improved oxygen-scavenging materials for use in packaging articles.

SUMMARY

In one aspect, the invention is an oxygen-scavenging component suitable for use, for example, in packaging applications. The oxygen-scavenging component may be a polymer or non-polymer component, or a mixture thereof. In certain embodiments, the oxygen-scavenging component is a polymer (preferably a formable polymer) such as, for example, a polyester, a polyurethane, a polyepoxide, a polyamide, or a polyolefin, that includes one or more of the oxygen-scavenging groups described herein.

In another aspect, the invention is an oxygen-scavenging component that is a reaction product of (i) a conjugated diene component having at least two conjugated double bonds and (ii) a double or triple bond of an unsaturated component. In some embodiments, the oxygen-scavenging component is a Diels-Alder reaction product of the above ingredients. In a presently preferred embodiment, the conjugated diene component is a cyclic conjugated diene component such as, for example, cyclopentadiene.

In yet another aspect, the invention is an oxygen-scavenging component having an oxygen-scavenging group that includes an unsaturated bicyclic group. Preferably, the unsaturated bicyclic group includes at least one double bond located between atoms of a ring.

In yet another aspect, the invention is a cyclic or acyclic oxygen-scavenging component having a heat of hydrogenation at least about as high as that of bicyclo[2.2.2]octene, more preferably at least about as high as that of bicyclo[2.2.1]heptene.

In yet another aspect, the invention is an oxygen-scavenging component having a cyclic oxygen-scavenging group that: (i) includes at least one ring having a double bond (preferably a carbon-carbon double bond) and (ii) preferably has a heat of hydrogenation greater than that of cyclohexene. In certain embodiments, the oxygen-scavenging group has a heat of hydrogenation that is at least about as high as that of bicyclo[2.2.2]octene, and more preferably at least about as high as that of bicyclo[2.2.1]heptene.

In yet another aspect, the invention is an oxygen-scavenging composition that includes an oxygen-scavenging component described herein and an oxidation catalyst. In some embodiments, the composition is a polymer composition that contains one or more polymers. The oxygen-scavenging component may be present as a separate non-polymer component in the polymer composition and/or may be included in a polymer (e.g., as a backbone or pendant group of the polymer). In some embodiments, the polymer composition includes one or more formable polymers.

In yet another aspect, the invention is a solution or dispersion including the oxygen-scavenging component and/or composition and a suitable solvent. The solution or dispersion may be applied, for example, as a coating for packaging articles.

In yet another aspect, the invention is a packaging material including the oxygen-scavenging component and/or composition. The packaging material may include the oxygen-scavenging component and/or composition alone or as a blend with other polymers in a single layer package such as, for example, a bottle or a film. Alternatively, the oxygen-scavenging component and/or composition may be used alone or as a blend with other polymers in one or more layers in a multi-layered package such as, for example, a bottle or a film.

In yet another aspect, the invention is a method for forming an oxygen-scavenging component. The method preferably includes providing a conjugated diene component and an unsaturated component, and forming an oxygen-scavenging component that includes a cyclic oxygen-scavenging group that is a reaction product of the conjugated diene component and the unsaturated component. In some embodiments, the conjugated diene component or the unsaturated component may be a polymer. In a preferred embodiment, the cyclic oxygen-scavenging group is a Diels-Alder reaction product of (i) a ring of a conjugated diene component having at least two conjugated double bonds and (ii) a double or triple bond of an unsaturated component. The cyclic oxygen-scavenging group preferably includes at least one ring having a double bond (preferably a carbon-carbon double bond) located between atoms of the ring.

In yet another aspect, the invention is a method for forming an oxygen-scavenging component that preferably includes reacting (i) a conjugated diene component that includes a cyclic group having at least two conjugated double bonds (more preferably a cyclopentadiene component) and (ii) a polymer or polymer precursor having at least one double or triple bond. In some embodiments where an unsaturated polymer precursor is used to form the above reaction product, a polymer may be formed that includes the reaction product, wherein at least one condensation linkage group attaches the reaction product to another portion of the polymer. In some embodiments, the polymer precursor is a fatty acid or succinic anhydride derivative that includes at least one double or triple bond.

The above summary of the invention is not intended to describe each disclosed embodiment or every implementation of the invention. The description that follows more particularly exemplifies illustrative embodiments. In several places throughout the application, guidance is provided through lists of examples, which can be used in various combinations. In each instance, the recited list serves only as a representative group and should not be interpreted as an exclusive list.

The details of one or more embodiments of the invention are set forth in the description below. Other features, objects, and advantages of the invention will be apparent from the description and the claims.

Definitions

Unless otherwise specified, the following terms as used herein have the meanings provided below.

The term "organic group" means a hydrocarbon group (with optional elements other than carbon and hydrogen, such as oxygen, nitrogen, sulfur, and silicon) that is classified as an acyclic group, cyclic group, or combination of acyclic and cyclic groups (e.g., alkaryl and aralkyl groups). The term "acyclic group" means a saturated or unsaturated linear or branched hydrocarbon group. This term is used to encompass alkyl, alkenyl, and alkynyl groups, for example. The term "alkyl group" means a saturated linear or branched hydrocarbon group including, for example, methyl, ethyl, isopropyl, t-butyl, heptyl, dodecyl, octadecyl, amyl, 2-ethylhexyl, and the like. The term "alkenyl group" means an unsaturated, linear or branched hydrocarbon group with one or more carbon-carbon double bonds, such as a vinyl group. The term "alkynyl group" means an unsaturated, linear or branched hydrocarbon group with one or more carbon-carbon triple bonds. The term "cyclic group" refers to a group that contains one or more closed ring hydrocarbon groups, which can include heteroatoms and/or one or more pendant groups, including, e.g., ring and/or non-ring (e.g., acyclic) pendant groups. The term includes any type of substituted or unsubstituted ring hydrocarbon group, including, for example, bicyclic groups and fused ring groups. The term "bicyclic group" refers to a group that includes at least two closed ring hydrocarbon groups, which can include heteroatoms, that share at least two bonds and three atoms. Nobornene (also referred to as bicyclo[2.2.1]heptene) is an example of a bicyclic group. The term "fused ring group" refers to a closed ring hydrocarbon group, which can include heteroatoms, that includes at least two rings that share one bond and two atoms. Napthalene is an example of a fused ring group.

A group that may be the same or different is referred to as being "independently" something. Substitution is anticipated on the organic groups of the compounds of the invention. As a means of simplifying the discussion and recitation of certain terminology used throughout this application, the terms "group" and "moiety" are used to differentiate between chemical species that allow for substitution or that may be substituted and those that do not allow or may not be so substituted. Thus, when the term "group" is used to describe a chemical substituent, the described chemical material includes the unsubstituted group and that group with O, N, Si, or S atoms, for example, in the chain (as in an alkoxy group) as well as carbonyl groups or other conventional substitution. Where the term "moiety" is used to describe a chemical compound or substituent, only an unsubstituted chemical material is intended to be included. For example, the phrase "alkyl group" is intended to include not only pure open chain saturated hydrocarbon alkyl substituents, such as methyl, ethyl, propyl, t-butyl, and the like, but also alkyl substituents bearing further substituents known in the art, such as hydroxy, alkoxy, alkylsulfonyl, halogen atoms, cyano, nitro, amino, carboxyl, etc. Thus, "alkyl group" includes ether groups, haloalkyls, nitroalkyls, carboxyalkyls, hydroxyalkyls, sulfoalkyls, etc. On the other hand, the phrase "alkyl moiety" is limited to the inclusion of only pure open chain saturated hydrocarbon alkyl substituents, such as methyl, ethyl, propyl, t-butyl, and the like. The disclosure of a particular group herein is intended to be an explicit disclosure of both the group and the corresponding moiety. Thus, disclosure of an "alkyl group" is also explicit disclosure of the "alkyl moiety" included therein.

The term "component" refers to any compound that includes a particular feature or structure. Examples of components include compounds, monomers, oligomers, polymers, and organic groups contained therein.

The term "double bond" is non-limiting and refers to any type of double bond between any suitable atoms (e.g., C, O, N, etc.).

The term "triple bond" is non-limiting and refers to any type of triple bond between any suitable atoms.

The term "conjugated diene component" refers to a component that includes at least two conjugated double bonds, each of which can be any type of double bond. Thus, for example, a component that includes a —CH═CH—CH═CH—CH═CH— structure constitutes a conjugated diene component even though it includes 3 or more double bonds.

The term "cyclic conjugated diene component" refers to a conjugated diene component having at least one ring that includes at least one conjugated double bond located therein. The one or more other conjugated double bonds, for example, may also be located on the ring and/or may be located in a group attached to the ring.

The term "unsaturated component" refers to a component that includes at least one double bond or triple bond.

The term "cyclopentadiene" includes both cyclopentadiene and dicyclopentadiene.

The term "cyclopentadiene component" refers to a component that contains a substituted or unsubstituted cyclopentadiene group, and encompasses both cyclopentadiene and dicyclopentadiene.

The term "thermoplastic" refers to a material that melts and changes shape when sufficiently heated and hardens when sufficiently cooled. Such materials are typically capable of undergoing repeated melting and hardening without exhibiting appreciable chemical change. In contrast, a "thermoset" refers to a material that is crosslinked and does not "melt."

The term "food-contact surface" refers to a surface of an article (e.g., a food or beverage container) that is in contact with, or suitable for contact with, a food or beverage product.

The term "comprises" and variations thereof do not have a limiting meaning where these terms appear in the description and claims.

The term "oxygen scavenging" means absorbing, consuming, or reducing the amount of oxygen from a given environment.

The term "packaging article" as used herein includes both packaging articles in their final commercial form, as well as any intermediate stages. Preforms, which are frequently formed for plastic containers and other packaging articles, are one example of such an intermediate stage. The term includes at least films, bottles, containers, closures, closure liners, etc.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, "a," "an," "the," "at least one," and "one or more" are used interchangeably. Thus, for example, a coating composition that comprises "an" additive can be interpreted to mean that the coating composition includes "one or more" additives.

Also herein, the recitations of numerical ranges by endpoints include all numbers subsumed within that range (e.g., 1 to 5 includes 1, 1.5, 2, 2.75, 3, 3.80, 4, 5, etc.). Furthermore, disclosure of a range includes disclosure of all subranges included within the broader range (e.g., 1 to 5 discloses 1 to 4, 1.5 to 4.5, 1 to 2, etc.).

DETAILED DESCRIPTION

In one aspect, the invention provides an oxygen-scavenging component, which preferably includes at least one group capable of scavenging oxygen. The oxygen-scavenging group is preferably a cyclic oxygen-scavenging group ("cyclic OS group") having at least one substituted or unsubstituted hydrocarbon or heteroatom ring with at least one double bond contained therein. The oxygen-scavenging component may be a polymer or non-polymer component. In presently preferred embodiments, the oxygen-scavenging component is an oxygen-scavenging polymer ("OS polymer"), and more preferably a formable OS polymer.

In another aspect, the invention provides a method for forming an OS component having at least one cyclic OS group. In preferred embodiments, a conjugated diene component (preferably a cyclic conjugated diene component) and an unsaturated component are reacted to form the cyclic OS group. This reaction is preferably accomplished using a Diels-Alder reaction.

In another aspect, the invention provides an oxygen-scavenging composition ("OS composition") that includes the OS component described herein and preferably an optional polymer. The OS component may be covalently attached to the optional polymer (e.g., as backbone or pendant group of the polymer) or may be present as a separate component. In preferred embodiments, the OS composition includes one or more oxidation catalysts, one or more additional polymers, or a combination of one or more oxidation catalysts and one or more additional polymers.

In another aspect, the invention provides articles that include the OS component and/or composition of the invention. In preferred embodiments, the OS composition is suitable for incorporation in a packaging article (e.g., for use in packaging an oxygen-sensitive product).

The OS component of the invention may exhibit various desirable properties. For example, preferred OS components may exhibit one or more of enhanced oxygen-scavenging kinetics and/or capacity, enhanced cost, enhanced compatibility with other polymers, an absence or reduction in formation of mobile oxidative cleavage byproducts, etc.

In embodiments where the OS component is included in a polymer, the OS polymer can be any suitable type of polymer, including thermoplastic, non-thermoplastic (e.g., thermosetting), or a mixture of both, with formable polymers being preferred in certain embodiments. Similarly, the OS polymer can be an addition polymer, a condensation polymer, or a polymer that includes both condensation and addition linkages or segments. The OS polymer may have any suitable type of backbone. The configuration of the backbone may vary depending upon a variety of considerations, including, for example, the desired properties of a composition incorporating the OS polymer, the expected use of the OS polymer, other materials with which the OS polymer will be mixed or contact, or the type of OS polymer desired.

Examples of suitable OS polymers include polyesters and copolyesters such as polyethylene terephthalate ("PET"), polybutylene terephthalate ("PBT"), polyethylene naphthalate ("PEN"), polybutylene naphthalate ("PBN") and any other suitable esters of acids and diols; polylactones such as polycaprolactone; polymethyl methacrylate ("PMMA"); styrene/maleic anhydride ("SMA"); polyoxymethylene ("POM"); ketones such as polyetheretherketone ("PEEK") and polyaryletherketone ("PAEK"); thermoplastic fluoropolymers; polycarbonate ("PC"); polyurethanes; polyarylate ("PAR"); polyphenylene oxide ("PPO"); polyamides such as nylon 6, nylon 6,6, nylon 11, nylon 6,12 and nylon 12; imides such as polyimide ("PI"), polyetherimide ("PEI") and polyamideimide ("PAI"); polyphthalamide; sulfones such as polysulfone ("PSul"); polyarylsulfone ("PAS") and poly ether sulfone ("PES"); polyaminoacids; polydimethylsiloxanes; polyolefins such as polyethylene ("PE"), polypropylene ("PP"), polybutylene ("PB"), and polybutadiene ("PBD"); styrenes such as polystyrene ("PS"), poly α-methyl styrene and styrene/acrylonitrile ("SAN"); vinyls such as polyvinyl chloride ("PVC") and polyvinylnaphthalene ("PVN"); mixtures thereof; and copolymers and derivatives thereof which preferably do not unsuitably interfere with oxygen scavenging.

In preferred embodiments, the OS polymer is suitable for contacting food or beverage products. In a presently preferred embodiment, the OS polymer is a polyester, and even more preferably a PET.

The OS polymer of the invention can be of any suitable size. In preferred embodiments, the OS polymer has a number average molecular weight ($M_n$) of at least about 1,000, more preferably at least about 2,600, even more preferably at least about 5,000, and even more preferably at least about 25,000. Preferably, the OS polymer has a $M_n$ of less than about 100,000, more preferably less than about 50,000, and even more preferably less than about 35,000.

Examples of formable polymers include polymers that can be mechanically shaped (e.g., into a three-dimensional article) by processes such as, for example, injection molding, extrusion, pressing, casting, rolling, or molding.

As previously mentioned, the OS component may be a non-polymer component such as, for example, an oligomer, a polymer precursor, and/or a low-molecular-weight compound. Some examples of non-polymer OS components include Diels-Alder reaction products of a conjugated diene component (e.g., cyclopentadiene) and an unsaturated oil (e.g., linseed oil) such as the DILULIN product commercially available from Cargill, succinic anhydride derivatives including one or more OS groups described herein (e.g., the material of Formula III described below), and fatty-acid derivatives including one or more OS groups described herein (e.g., a Diels-Alder reaction product of an unsaturated fatty acid and cyclopentadiene). In such embodiments, the OS component may exhibit a number average molecular weight outside the aforementioned $M_n$'s. For example, in some embodiments, the OS component may have a $M_n$ of less than about 2,600 or less than about 1,000.

As discussed above, the OS component preferably includes one or more cyclic OS groups, which can include any suitable type of one or more rings. Examples of suitable rings may include unsubstituted hydrocarbon rings, substituted hydrocarbon rings, heteroatom rings, and combinations thereof In some embodiments, the cyclic OS groups may contain a plurality of rings. The cyclic OS group preferably includes at least one ring having at least one double bond located in the ring. While not intending to be bound by any theory, it is believed that locating a double bond in a ring structure may reduce or eliminate the production of mobile (or volatile) byproducts resulting from oxygen scavenging. Exposure of OS polymers having double bonds located in open chain (i.e., acyclic) segments to oxygen can result in the formation of cleavage fragments through oxidative cleavage of one or more double bonds. This cleavage can result in the production of low-molecular-weight fragments that may be mobile and potentially capable of migrating out of a coating or layer containing the conventional polymer. For packaged food or beverage products, the presence of oxidative cleavage fragments may adversely affect the organoleptic properties (e.g., taste, odor, etc.) of the packaged product, especially if the cleavage fragments migrate out of the packaging article and into the packaged product. Similarly, the presence of cleavage fragments may also be undesirable in certain non-food packaging articles, such as, for example, articles for use in packaging pharmaceuticals or other medical products.

Preferred OS polymers of the invention exhibit substantially reduced generation of mobile scavenging byproducts relative to oxygen-scavenging polymers having open-chain unsaturation (i.e., double bonds that are not located between atoms of a ring). For example, when analyzed using gas chromatography techniques, certain polyester polymers of the invention having linoleic acid functionality modified with cyclopentadiene (via a Diels-Alder reaction) elute substantially reduced amounts of potentially migratory low-molecular-weight compounds relative to the unmodified form of the polyester (i.e., the base polyester having linoleic acid functionality not modified with cyclopentadiene).

Cyclic OS groups of the invention can contain one or more double bonds between any suitable types of atoms. Examples of suitable double bonds include carbon-carbon ("C=C"), carbon-oxygen ("C=O"), carbon-nitrogen ("C=N"), nitrogen-nitrogen ("N=N"), and nitrogen-oxygen (N=O) double bonds, with C=C being preferred.

The OS polymer of the invention can contain any suitable number of cyclic OS groups. While not intending to be bound by any theory, it is believed that the oxygen-scavenging ability of the cyclic OS group is based on the presence of at least one double bond. Thus, it is believed that the number of cyclic OS groups present in the OS polymer is an important factor in determining its oxygen-scavenging capacity. A sufficient number of cyclic OS groups are preferably included in the OS polymer to provide suitable oxygen-scavenging properties. The number of cyclic OS groups included in the OS polymer may vary depending on a variety of considerations, including, for example, the intended application (e.g., the level of oxygen-scavenging capacity and/or rate desired, the thickness of an article or layer in which the OS polymer is to be employed, the desired concentration of OS polymer in an article or composition, etc.) and whether other types of oxygen-scavenging groups are present in the OS polymer or a composition containing the OS polymer.

Iodine value is a useful measure for characterizing the average number of double bonds present in a material. OS polymers of the invention may have any suitable iodine value to achieve the desired result. The iodine value of the OS polymers may vary depending upon a variety of considerations such as, for example, those discussed above. For example, in an embodiment where an OS polymer is desired that will be employed at a concentration of 1 weight percent ("wt-%") in an article, the OS polymer preferably has an iodine value of about 5 to about 1,000, more preferably about 10 to about 500, or even more preferably about 50 to about 300. Similarly, in other embodiments where an OS polymer is desired for use at a different concentration, the OS polymer may have an iodine value that is a ratio of the above iodine values. Thus, for example, in an embodiment where an OS polymer is desired that will be employed at a concentration of 100 wt-% in an article (i.e., the article is formed from neat OS polymer), the OS polymer preferably has an iodine value that is about 100 times less than that of the aforementioned OS polymer to be employed at a 1 wt-% concentration. That is, the OS polymer to be employed neat preferably has an iodine value of about 0.05 to about 10, more preferably about 0.1 to about 5, and even more preferably about 0.5 to about 3. The aforementioned iodine values correspond to the number of grams of iodine that will react with the double bonds present in 100 grams of the material tested. Iodine values may be determined, for example, using IUPAC method 2.205 (ISO 3961).

In certain preferred embodiments, the OS group includes an unsaturated bicyclic group having one or more double bonds. While not intending to be bound by theory, it is believed that OS groups including an unsaturated bicyclic group may possess one or more of the following benefits: enhanced reactivity with oxygen, enhanced compatibilization of a polymer containing the OS group with other materials, and/or reduced production of mobile oxidative cleavage fragments. While not intending to be bound by theory, the carbon-carbon double bonds present in unsaturated bicyclic groups such as norbornene are believed to exhibit enhanced oxygen-scavenging kinetics relative to carbon-carbon double bonds present in conventional acyclic oxygen-scavenging groups. The high level of ring strain typically present in unsaturated bicyclic groups is believed to contribute to the enhanced oxygen-scavenging kinetics. For further discussion of the reactivity of bicyclic compounds, see, for example, D. E. Van Sickel, F. R. Mayo, R. M. Arluck JACS (32)1967, 3680 "Bridging of the cyclohexane ring has thoroughly deactivated the allylic bridgehead hydrogen atoms and increased the reactivity of the double bond by 8 to ninefold." By way of example, an unsaturated monomer functionalized with cyclopentadiene via a Diels-Alder reaction exhibited excellent oxygen scavenging performance, when tested using a vial test oxygen scavenging methodology similar to that of the Examples, whereas the unmodified unsaturated monomer did not.

In one embodiment, the OS group includes a bicyclic structure represented by the IUPAC (International Union of Pure and Applied Chemistry) nomenclature Expression (I):

$$\text{bicyclo[x.y.z]alkene}$$

In Expression (I), x is an integer having a value of 2 or more, y and z are each an integer having a value of 1 or more, and the term alkene refers to the IUPAC nomenclature designation (e.g., hexene, heptene, heptadiene, octene, etc.) for a given bicyclic molecule.

In preferred embodiments, x has a value of 2 or 3 (more preferably 2) and each of y and z independently have a value of 1 or 2.

Examples of some suitable OS groups represented by Expression (I) include bicyclo[2.1.1]hexene, bicyclo[2.2.1]heptene (i.e., norbornene), bicyclo[2.2.2]octene, bicyclo[2.2.1]heptadiene, and bicyclo[2.2.2]octadiene. Bicyclo[2.2.1]heptene is a presently preferred OS group.

It is contemplated that the OS groups represented by Expression (I) may contain one or more heteroatoms (e.g., nitrogen, oxygen, sulfur, etc.) and may be substituted to contain one or more additional substituents. For example, one or more cyclic groups (including, e.g., pendant cyclic groups and ring groups fused to a ring of a bicyclic OS group) or acyclic groups may be attached to the bicyclic group represent by Expression (I).

It is a surprising discovery of the present invention that a useful measure of the relative suitability of the OS component is the heat of hydrogenation. While not intending to be bound by theory, it is believed that the heat of hydrogenation of a double bond of an unsaturated group corresponds to the propensity of the unsaturated group to scavenge oxygen, with a higher heat of hydrogenation indicating a greater propensity to scavenge oxygen. For further discussion of heats of hydrogenation see, for example, V.V. Voronenkov, Russian Chemical Reviews, 44 (4), 1975.

In some embodiments, the invention provides a cyclic or acyclic OS group having: (i) one or more double bonds (preferably one or more carbon-carbon double bonds) and (ii) a heat of hydrogenation greater than that of cyclohexene. In a presently preferred embodiment, the OS group is a cyclic OS group that (i) includes one or more rings, at least one of which is preferably an unsaturated ring with one or more double bonds (preferably carbon-carbon) located between atoms of the ring and (ii) has a heat of hydrogenation greater than that of cyclohexene. Examples of cyclic OS groups having a heat of hydrogenation greater than that of cyclohexene include bicyclo[2.2.1]heptene, bicyclo[2.2.2]octene, methylenecyclobutane, ethylidenecyclopropane, bicyclo[2.2.2]octadiene, bicyclo[2.2.1]heptadiene, and 1,2-dimethylcyclopropene. In certain embodiments, the OS group (and preferably a carbon-carbon double bond of the OS group) has a heat of hydrogenation that is at least about as high as that of bicyclo[2.2.2]octene, and more preferably, at least about as high as that of bicyclo[2.2.1]heptene. As used herein, when a heat of hydrogenation is stated to be, for example, "at least X," "greater than X," or the like, it should be understood that reference is made to the absolute value of the heat of hydrogenation because heats of hydrogenation are typically reported as negative values, with a larger negative value indicating a higher heat of hydrogenation (e.g., −40 kcal/mole is a higher heat of hydrogenation than −10 kcal/mole).

Table 1 below provides the heat of hydrogenation values for a variety of unsaturated molecules. The heat of hydrogenation values reported in Table 1 were obtained from the following published literature sources: R. B Turner, W. R. Meador, R. E. Winkler, J. Am. Chem. Soc., (79) p. 4116 (1957); R. B. Turner, A. D. Jarrett, P. Goebel, B. J. Mallon, J. Am. Chem. Soc, (95), p. 790 (1973); and R. B. Turner, W. R. Meador, J. Am. Chem. Soc., (79) p. 4133 (1957); and William H. Brown, Cristopher S. Foote, Brent L. Iverson, Organic Chemistry, p 784 (2005).

TABLE 1

| Molecule | Heat of Hydrogenation (kcal/mole*) |
|---|---|
| cis-Cyclooctene | −22.98 |
| Cycloheptene | −25.85 |
| Cyclopentene | −26.04 |
| Cyclohexene | −27.10 |
| trans-2-Butene | −27.62 |
| Bicyclo[2.2.2]octadiene** | −56.21 (−28.11) |
| Bicyclo[2.2.2]octene | −28.25 |
| cis-2-Butene | −28.57 |
| Methylenecyclobutane | −29.43 |
| 1-Butene | −30.3 |
| Bicyclo[2.2.1]heptene | −33.13 |
| Bicyclo[2.2.1]heptadiene** | −68.11 (−34.06) |
| Ethylidenecyclopropane | −37.01 |
| 1,2-Dimethylcyclopropene | −43.3 |

*Data is reported in kilocalories per mole of each molecule.
**For these molecules, the heat of hydrogenation value includes the heat of hydrogenation for two carbon-carbon double bonds present in each molecule. The heat of hydrogenation value for each carbon-carbon double bond will typically be approximately one-half that of the entire molecule, and is the value reported in parentheses. While not intending to be bound by any theory, factors such as resonance effects will lower the heat of hydrogenation for a conjugated polyene relative to the respective non-conjugated isomer.

As evidenced by the data in Table 1, bicyclic structures such as bicyclo[2.2.1]heptene and bicyclo[2.2.2]octene exhibit a higher heat of hydrogenation than cyclohexene. While not intending to be bound by theory, the higher heats of hydrogenation for bicyclo[2.2.1]heptene and bicyclo[2.2.2]octene relative to cyclohexene is believed to be attributable to the increased ring strain present in the bicyclic structures. It is believed that the heat of hydrogenation for molecules such as those listed in Table 1 is a strong indicator of the propensity of the molecule to scavenge oxygen when included as a covalently attached group in a polymer. For example, as illustrated below in the Examples Section, a polymer including bicyclo[2.2.1]heptene groups exhibits robust oxygen-scavenging properties (when combined with a suitable amount of oxidation catalyst) in the absence of a costly aging period (which is required for certain conventional oxygen-scavenging materials).

In certain preferred embodiments, the OS component of the invention includes one or more unsaturated acyclic or cyclic OS groups (preferably cyclic) having a double bond (preferably a carbon-carbon double bond) with a heat of hydrogenation greater than 27.1 kcal/mole. In a particularly preferred embodiment, the OS component includes one or more unsaturated acyclic or cyclic OS groups (preferably cyclic) with a double bond (preferably a carbon-carbon double bond) that has a heat of hydrogenation of preferably at least about −28 kcal/mole, more preferably at least about −30 kcal/mole, and even more preferably at least about −33 kcal/mole. Some examples of OS groups having such heats of hydrogenation are provided in Table 1 above. The upper end of the heat of hydrogenation for the OS groups is not particularly limited and can be any suitable heat of hydrogenation for a given application.

The heat of hydrogenation for an OS group may be determined using the techniques described in the literature sources of Table 1. Typically, the beat of hydrogenation for a molecule is substantially the same as the heat of hydrogenation value for the molecule when present as a group of a polymer, although it is possible that other moieties present on a polymer may interfere with the determination of the heat of hydrogenation value for the group of interest. Thus, one useful approach for determining the heat of hydrogenation value for an oxygen-scavenging group of a polymer is to determine (either experimentally using known methods or by consulting reported literature values) the heat of hydrogenation value for a molecule having the structure of the oxygen-scavenging group. If more than one double bond is present in the oxygen-scavenging group, appropriate steps should preferably be taken to normalize the heat of hydrogenation per double bond present.

The cyclic OS groups can be located at any suitable location, including, for example, in a backbone of the OS polymer, a pendant group of the OS polymer, or at both backbone and pendant locations. In addition to the cyclic OS groups, the OS polymer can also include one or more additional oxygen-scavenging groups, which may be any suitable type of oxygen-scavenging group. Examples of additional oxygen-scavenging groups may include acyclic oxygen-scavenging groups (e.g., acyclic hydrocarbon groups containing $C=C$ double bonds such as, for example, polybutadiene groups), polyamide groups (e.g., groups formed via polymerization of adipic acid and metaxylene diamine), and any other suitable oxygen-scavenging group.

In presently preferred embodiments, the cyclic OS group is formed using a conjugated diene component that is preferably capable of participating in a Diels-Alder reaction with an unsaturated component (often referred to as a "dieneophile" in the context of a Diels-Alder reaction). Diels-Alder reactions (often referred to as [4+2] cycloadditions) typically involve the addition of an unsaturated component across the 1,4 positions of a conjugated diene component to form a cycloaddition reaction product that is typically cyclic or bicyclic in nature. Typically, at least one of the conjugated diene and unsaturated components contains one or more substituents that "activate" the component toward reaction, although in some instances one or both components can contain a "deactivating" substituent or substituents. The Diels-Alder reaction is generally considered to be a concerted reaction, and as such, either component can be the "electron donor" or "electron acceptor" depending upon the substituents bonded thereto.

The conjugated diene component used in the method of the invention can be any suitable type of compound that contains any suitable type and combination of conjugated double bonds. Examples of suitable double bonds include $C=C$, $C=O$, $C=N$, $N=N$, and $N=O$ double bonds, with $C=C$ being preferred. The conjugated double bonds can be present in an acyclic group (e.g., butadiene), a cyclic group (including, e.g., cyclic, bicyclic, and fused rings), or a combination of both. In some embodiments, the conjugated diene component is present in a polymer or polymer precursor. In some embodiments, the conjugated diene component includes an aromatic group preferably capable of participating in a Diels-Alder reaction. Examples of conjugated dienes capable of participating in Diels-Alder reactions include anthracene, butadiene (including, e.g., dimethyl butadiene), cyclohexadiene, cyclopentadiene (including, e.g., 1-alkyl cyclopentadienes or 2-alkyl cyclopentadienes), furan, isoprene, methyl vinyl ketone, thiophene, polymers and polymer precursors containing any of these, derivatives thereof, and combinations thereof.

Presently preferred conjugated diene components include at least one ring preferably having about 5 to about 8 atoms in the ring, and more preferably 5 or 6 atoms in the ring. In a particularly preferred embodiment, the conjugated diene component includes at least one 5-member ring, with cyclopentadiene being a presently preferred 5-member ring.

In a preferred embodiment, cyclopentadiene is reacted with a $C=C$ of an unsaturated component to yield a norbornene group.

Suitable unsaturated components of the invention include any components capable of participating in a Diels-Alder reaction to form a cyclic OS group. The unsaturated component can be any suitable type of compound that contains one or more double or triple bonds. Examples of suitable double and triple bonds include $C=C$, $C=O$, $C=N$, $N=N$, $N=O$, carbon-carbon triple bonds ("$C\equiv C$"), and carbon-nitrogen triple bonds ("$C\equiv N$"), with $C=C$ bonds being presently preferred. In some embodiments, the unsaturated component is present in a polymer or polymer precursor.

As previously mentioned, the conjugated diene component and/or the unsaturated component may contain any suitable electron-donating group, electron-withdrawing group, or a combination of both. Diels-Alder reactions can typically be accelerated using groups that activate the reactant pair by making one of the conjugated diene or unsaturated components more electron-deficient and the other more electron-rich (e.g., by using an electron-withdrawing group on one reactant and an electron-donating group on the other). The electron-withdrawing or electron-donating effect of a given group on the conjugated diene or unsaturated components is typically exerted by a group located within one atom (i.e., alpha) of the reactive double or triple bond. That is, the electron-donating or electron-withdrawing group typically does not include an atom of the double or triple bond, but rather is bonded directly to an atom of the double or triple bond. Examples of electron-withdrawing groups include carbonyl (e.g., of an aldehyde, ketone, acid, ester, or amide group), nitrile, nitro, halo, substituted or unsubstituted aryl, hydroxy-methyl, amino- or substituted-aminomethyl, cyanomethyl, halomethyl and vinyl groups. Examples of electron-donating groups include straight chain, branched chain, and cyclic alkyl, amino, substituted amino, hydroxyl, and ether groups. In certain embodiments of the invention, one of the conjugated diene or unsaturated components contains one or more electron-donating group whereas the other contains one or more electron-withdrawing group.

OS polymers of the invention may be formed using a wide array of processes including, for example, reactor polymerization and reactive extrusion. In reactive extrusion, the components may be fed into the mixing zone of the extruder. The components may be mixed together before feeding into the extruder, or may be fed separately. Preferably, the components will be fed separately. As part of the extrusion process, the components will be subjected to elevated temperature, pressure, and shear as the components travel through the extruder. This process mixes the components, and also causes the components to react, forming the polymer composition.

The one or more cyclic OS groups can be incorporated into the OS polymer using any suitable reaction method, including, for example, (i) forming the OS polymer from a polymer precursor (e.g., a monomer or oligomer) containing a pre-formed cyclic OS group, (ii) providing a preformed polymer and then modifying the polymer to contain the cyclic OS group, or (iii) combining the reactants for forming the cyclic OS group with reactants (e.g., monomers and/or oligomers) for forming the polymer and reacting the combined reactants to form the OS polymer containing one or more cyclic OS groups.

An example of a method for forming the cyclic OS group includes reacting a conjugated diene component with an unsaturated component to produce a polymer precursor (e.g., a monomer or oligomer) containing at least one cyclic OS group. For example, an addition or condensation monomer containing one of the conjugated diene component or unsaturated component can be reacted with the other of the conjugated diene component or unsaturated component to form a monomer including a cyclic OS group, whereby the monomer is capable of being polymerized into a polymer. Examples of suitable polymer precursors include unsaturated mono- or poly-acids (or anhydrides or esters thereof), alcohols, amines, isocyanates, thiols, vinyls, and combinations thereof. In certain embodiments, the unsaturated component is a polymer precursor in the form of an unsaturated fatty acid or unsaturated succinic anhydride derivative.

In some embodiments, polymer precursors containing at least one cyclic OS group are incorporated into the OS polymer such that at least one condensation linkage group attaches the polymer precursor to another portion of the OS polymer. For example, in one such embodiment, the polymer precursor may be incorporated into a backbone of the OS polymer such that a pair of condensation linkage groups attach the polymer precursor to the backbone.

In another embodiment of the method of the invention, a preformed polymer that includes at least one of the unsaturated or conjugated diene components is provided. For example, a polymer having one or more double or triple bonds (i.e., the unsaturated component) capable of participating in a Diels-Alder reaction can be reacted with a conjugated diene component to form an OS polymer including one or more cyclic OS groups, whereby the cyclic OS group is located at the former site of the unsaturated component that participated in the reaction. By way of example, an unsaturated polyester can be reacted with cyclopentadiene to yield a polyester having one or more norbornene groups.

In some embodiments, a cyclopentadiene component is reacted with an unsaturated component, preferably in the form of a substituted or unsubstituted alkene, to form a monomer containing an unsaturated bicyclic structure. Examples of suitable substituted or unsubstituted alkenes include monounsaturated or polyunsaturated acids, alcohols, amines, isocyanates, thiols, vinyls, or combinations thereof. Monounsaturated or polyunsaturated fatty acids and succinic anhydride derivatives are presently preferred.

Suitable unsaturated succinic anhydride derivatives include, for example, reaction products of maleic anhydride and a substituted alkene. Suitable substituents for the alkene include, for example, saturated or unsaturated hydrocarbon chains that may be (i) linear or branched, and substituted or unsubstituted, as well as (ii) substituted or unsubstituted phenyl groups. Some of the substituents on the alkenyl group may be bound together as part of a ring structure. Preferred succinic anhydride derivatives include octenyl succinic anhydride (OSA), nonenyl succinic anhydride (NSA), heptenyl succinic anhydride (HSA), and the like. OSA, shown below in Formula (II), is particularly preferred.

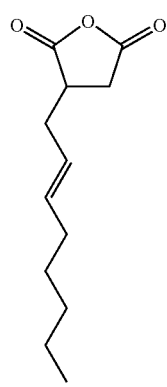

(II)

The benefits of using an unsaturated succinic anhydride derivative may include: ease of processing, general availability at low cost, ability to co-polymerize, compatibility with many polymers and monomers for reaction, stability during storage, and low toxicity. Unsaturated succinic anhydride derivatives may be reacted with a wide variety of materials, depending upon the type of polymer backbone desired. For example, a succinic anhydride derivative can be reacted with an alcohol or glycol to form a polyester. As another example, a succinic anhydride derivative may be reacted with an amine to form a polyamide.

For further information regarding unsaturated succinic anhydride derivatives and their use in forming polymers, see US Pub. No. 2006/0202161 by Share et al., which is incorporated herein by reference in its entirety.

While not wishing to be bound to any theory, Formula (III) below shows a preferred Diels-Alder reaction product that is believed to result from reacting OSA with cyclopentadiene.

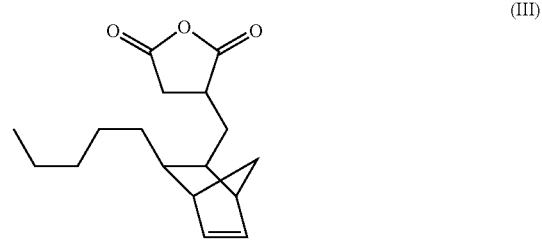 [SMILES: CCCCCC1C2C=CC(C2)C1CC1CC(=O)OC1=O]

(III)

The structure of Formula (III) is non-limiting with respect to stereochemistry and is intended to encompass all possible stereoisomers. As shown in Formula (III), the reaction product of OSA and cyclopentadiene is believed to include a norbornene bicyclic group.

In some embodiments, unsaturated fatty acids are reacted with a conjugated diene component to form fatty acids containing one or more unsaturated cyclic OS groups. Examples of suitable fatty acids include mono- or polyunsaturated fatty acids such as arichidonic, eleostearic, erucic, licanic, linoleic, linolenic, oleic, palmitoleic, ricinoleic acid, and mixtures thereof. Other useful fatty acids may include mixtures of saturated and unsaturated fatty acids such as, for example, fatty acids from natural or modified oils such as linseed oil, soybean oil, sunflower oil, safflower oil, castor oil, and mixtures thereof. In a presently preferred embodiment, linoleic acid is reacted with cyclopentadiene in a Diels-Alder reaction to form a reaction product having at least one cyclic OS group (which is believed to be a norbornene group).

Any suitable Diels-Alder reaction techniques or conditions can be employed to produce cyclic OS groups of the invention. By way of example, a Diels-Alder reaction using cyclopentadiene to produce a cyclic OS group can be carried out in a number of ways, including, for example, (i) combining dicyclopentadiene and an unsaturated component in a reaction vessel or (ii) separately cracking dicyclopentadiene to generate cyclopentadiene and then combining the cyclopentadiene and an unsaturated component in a reaction vessel.

By way of example, a suitable reaction product of dicyclopentadiene and an unsaturated component may be made using a Diels-Alder reaction process as follows: An unsaturated component is charged into a closed reactor purged with an inert gas such as nitrogen. The unsaturated component is heated to about 260° C. with constant stirring and dicyclopentadicne is added at a steady rate to the heated unsaturated component. While not intending to be bound by any theory, it is believed that the dicyclopentadiene dedimerizes into two molecules of cyclopentadiene in the reactor vessel, which then react with the double bonds of the unsaturated component. After the addition of the dicyclopentadiene is complete, heating of the reaction mixture is continued at a temperature of preferably not more than about 300° C., and even more preferably not more than about 275° C., for about 0.25 hour to about 5 hours. The reaction is generally permitted to proceed until substantially all of the cyclopentadiene has reacted with the unsaturated component. Thereafter, the reaction product is cooled and removed from the reaction vessel. For further discussion of Diels-Alder reaction conditions suitable for use with dicyclopentadiene, see for example, U.S. Pub. No. 2003/0036486, U.S. Pat. Nos. 5,693,715, and 5,288,805, which are incorporated herein by reference in their entirety.

OS compositions of the invention preferably include the OS component described herein and one or more optional oxidation catalysts. In some embodiments, the OS composition further includes one or more optional additional polymers or additives.

An optional oxidation catalyst is preferably included in compositions of the invention. In some embodiments, the oxidation catalyst may enhance the oxygen-scavenging properties of the OS component by catalyzing an oxygen-scavenging reaction involving the cyclic OS groups and/or optional additional oxygen-scavenging groups of the OS component.

A broad variety of metallic and organic compounds can catalyze the oxygen scavenging effect of certain oxygen-scavenging groups, and an appropriate compound may be selected based on any of cost, compatibility with the OS component, compatibility with other polymers or ingredients in a blend, and compatibility with other layers in a multi-layered article. Examples of suitable oxidation catalysts include transition metals, complexes of transition metals, photoinitiators and the like, and mixtures thereof.

Examples of suitable oxidation catalysts include transition metals such as cobalt, iron, nickel, aluminum, ruthenium, rhodium, palladium, antimony, osmium, iridium, platinum, copper, manganese, and zinc, as well as oxides, salts or complexes of these metals, and mixtures thereof. For example, cobalt II salts of short chain acids such as acetic acid or terephthalic acid, or long chain acids such as neodecanoic, stearic, 2-ethyl hexanoic, or octenyl succinic acid may be used. Salts of inorganic acids may also be used. For example, antimony chloride III, antimony chloride V, and cobalt chloride may be used. Preferred catalysts include salts of cobalt and long chain acids such as, for example, cobalt acetate, cobalt neodecanoate, cobalt stearate, cobalt octoate, and mixtures thereof.

Mixed metal nanoparticles may also be suitable as an oxidation catalyst. Suitable nanoparticles typically have an average particle size of less than about 200 nm, preferably less than about 100 nm, and more preferably between 5 and 50 nm.

When included, the oxidation catalyst is preferably present in an amount sufficient to catalyze the oxygen-scavenging ability of the OS component in the end use application. The amount used will depend partially upon the catalyst chosen. In general, however, when using transition metal catalysts or complexes, the amount of transition metal catalyst or complex present in the end use application (e.g., in a monolayer article or in a layer of a multilayer article) may suitably be greater than about 10 ppm by weight, preferably greater than about 25 ppm by weight, and more preferably greater than about 35 ppm by weight, based on the total amount of transitional metal in the catalyst or complex relative to the total weight of the composition. The amount of transition metal catalyst or complex present in the end use application may suitably be less than about 10,000 ppm by weight, preferably less than about 1,000 ppm by weight, and more preferably less than about 600 ppm by weight, based on the total amount of transitional metal in the catalyst or complex relative to the total weight of the composition. In general, when using a photoinitiator or blend of photoinitiators, the amount of photoinitiator present may suitably be greater than about 0.01% by weight, and preferably greater than about 0.1% by weight of the total composition. The amount of photoinitiator present may suitably be less than about 10% by weight, and preferably less than about 5% by weight of the total composition.

The amount of oxidation catalyst present in the OS composition may vary widely depending upon, for example, the amount of OS composition to be included in an article. For example, if a monolayer article or layer(s) of a multilayer article is to be formed from neat OS composition (i.e., 100 wt-% OS composition), and a transition metal catalyst or complex is to be used, then the amount of transition metal catalyst or complex present in the OS composition is preferably as described above for a desired end use application. If, however, the OS composition is to be diluted with additional material in forming the monolayer article or layer(s), then the OS composition preferably includes a higher concentration of catalyst to account for the amount of dilution. Thus, for example, in an embodiment where an OS composition is to be diluted twenty-fold in an end use, the OS composition preferably has a catalyst concentration that is about twenty times higher than the catalyst concentration desired in the end use. Moreover, depending upon the approach employed in such embodiments, portions of the OS composition may have even higher concentrations of catalyst than that of the overall blend. For example, in some embodiments where the OS composition is a blend of two or more different types of particles, all or substantially all of the catalyst may be introduced into the blend through incorporation of a catalyst concentrate particle into the blend.

In some embodiments, the method of introduction of the oxidation catalyst may impact the resultant composition's performance or properties. For example, in some cases the introduction of oxidation catalyst to the composition may cause undesirable side reactions within the composition that can lessen the composition's molecular weight, or cause discoloration of the composition. Other factors which may influence the composition's propensity to degrade include: the presence of appreciable amounts of water during melt processing of the polymer; the presence of foreign reactive functionalities (such as hydroxyl, amino, mercapto, carboxylic, etc.) during melt processing of the polymer; the presence of appreciable amounts of molecular oxygen during melt processing of the polymer; and/or the presence of appreciable amounts of strongly acidic (e.g., HCl, $H_2SO_4$), or strongly basic (e.g., KOH, etc.) materials during melt processing of the polymer. Typically, care should be taken to avoid such undesirable results, for example, by lessening the concentration of the aforementioned water, foreign reactive functionalities, molecular oxygen, or acidic or basic materials during melt processing of the polymer.

One consideration in this regard involves the choice of oxidation catalyst. Certain catalysts are less prone to catalyzing the aforementioned undesirable side reactions. As a result, one can, in some situations, select a suitable oxidation catalyst (i.e., a catalyst that provides the desired level of oxygen scavenging) that does not cause an undesirable amount of degradation of the composition. For example, cobalt oxide can generally be introduced to the composition with little observable degradation.

Another consideration is the conditions under which the oxidation catalyst is added to the composition. For example, it has been observed that prolonged exposure at high temperature of certain compositions containing the oxidation catalyst can result in an increased amount of degradation. As a result, processes that avoid prolonged, high temperature exposure of the oxidation catalyst within the composition can be beneficial in certain embodiments. This can be done, for example, by lessening exposure of the molten polymer to excessive levels of shear during mixing and/or transporting. Alternatively, the oxidation catalyst can be added to pre-formed polymer using mild melt mixing techniques such as a Buss kneader. Alternatively, the composition may be prepared in a batch reactor and the catalyst added quantitatively in a manner that minimizes the residence time of the molten polymer/catalyst blend prior to ejection, and cooling. In an extruder reactor, the catalyst may be added near the ejection port to minimize residence time of molten polymer with catalyst. Alternatively, the oxidation catalyst may be added at the point of injection molding or extruding an article.

As discussed above, compositions of the invention preferably include one or more other polymers in addition to the OS polymer. These additional polymers can be thermoplastic, non-thermoplastic (e.g., thermosetting), or a mixture of both—although thermoplastic polymers are preferred. Examples of suitable polymers that may be employed in addition to the OS polymer include any of the polymer types described above in regards to the OS polymer. The one or more additional polymers are preferably formable polymers useful in forming a packaging article and are preferably suitable for contacting food or beverage products. The one or more additional polymers also preferably exhibit a suitable level of compatibility with the OS polymer.

In some embodiments of the invention, the OS composition comprises a blend of the OS polymer and one or more additional polymers (preferably formable polymers), wherein the composition comprises from about 99 to about 1 wt-% of the OS polymer and from about 1 to about 99 wt-% of the one or more additional polymers, from about 95 to about 5 wt-% of the OS polymer and from about 5 to about 95 wt-% of one or more additional polymers, from about 90 to about 10 wt-% of the OS polymer and from about 10 to about 90 wt-% of one or more additional polymers, or from about 80 to about 20 wt-% of the OS polymer and from about 20 to about 80 wt-% of the one or more additional polymer. In a presently preferred embodiment, the OS polymer and the one or more additional polymers are polyesters, and preferably PET.

In general, any suitable material can be added to the OS compositions of the invention that produces a desired result. For example, fillers, processing aids, plasticizers, fire retardants, anti-fog agents, crystallization aids, impact modifiers, surface lubricants, denesting agents, stabilizers, antioxidants, ultraviolet light absorbing agents, catalyst deactivators, colorants, nucleating agents, acetaldehyde reducing compounds, reheat enhancing aids, fillers, anti-abrasion additives, and the like, and combinations thereof can be included. In one embodiment, the OS composition of the invention includes the OS component described herein (which as previously discussed can be a polymer component, non-polymer component, or combination thereof), an oxidation catalyst, a formable polymer (preferably thermoplastic), and a colorant.

In the event some molecular weight degradation may occur, then it is within the scope of this invention to subject the degraded composition to a solid-stating process to rebuild the molecular weight. For more seriously degraded materials, the composition may be purified to remove or lessen the amount of undesirable discolored material.

If desired, the OS composition (which, in some embodiments, is the OS component alone) may be dissolved in a suitable solvent to form a coating solution or may be blended with water and/or a suitable organic solvent to form a coating dispersion. The coating solution or dispersion may be applied using any suitable method, including, for example, spraying the coating solution or dispersion onto a surface of an article and drying the coating to form an oxygen-scavenging coating. If desired, the coating solution or dispersion may be applied between layers of another suitable polymer to form an oxygen-scavenging film.

Another aspect of the invention is an article incorporating OS compositions produced using methods of the invention. In preferred embodiments, OS compositions of the invention are particularly useful in oxygen-scavenging layers (also referred to as "oxygen barrier layers") of packaging articles. Examples of packaging articles include bottles (including bottle crowns, caps, and other closures), cups, bowls, cartons (including, e.g., paperboard or fiberboard cartons), containers, films, wraps (including, e.g., meat wraps), liners (e.g., crown, cap, or closure liners), coatings, trays, and flexible bags for industrial, commercial, medical, or residential use. The packaging articles may be rigid or flexible based on, for example, the number and type(s) of layers, the method of formation of the packaging article, and other relevant parameters.

Packaging articles incorporating the OS composition of the invention can be used to package any product for which it is desirable to inhibit exposure to oxygen during storage. Examples of such products include certain food or beverage products (e.g., fruit juices, wine, beer, meat, etc.), pharmaceuticals, medical products, corrodible metals, and electronic devices.

Packaging articles incorporating OS compositions of the invention can be of any desired construction. The packaging articles can be formed from multiple layers of material (referred to as "multilayer" articles) or a single layer of material (referred to as "monolayer" articles). The packaging articles can include a single structural layer or a structural layer and one or more additional layers. The one or more additional layers can be, for example, a gas barrier layer (e.g., a layer incorporating a passive barrier material such as an ethylene-vinyl alcohol copolymer ("EVOH")), an oxygen-scavenging layer, a food-contact layer, a structural layer, an adhesive layer, or any layer that combines one or more of these, alone or in any combination. Multilayer packaging articles are typically prepared using coextrusion, injection molding, injection blow molding, stretch blow molding, coating, or lamination, among other techniques. Monolayer packaging articles are typically prepared by solvent casting, injection molding, blow molding, or by extrusion, among other techniques.

Articles of the invention may be formed using the OS composition of the invention alone, a blend of the OS composition with one or more other polymers or materials, or a multi-layer construction incorporating one or more layers including the OS composition. Additionally, the OS composition may be used as a coating, as a lining, or as part of a blend for a coating or lining of another article. In some embodiments, the OS composition may be applied to a substrate such as a metal, plastic, fiberboard, or paperboard substrate.

A monolayer article is an article formed of substantially the same composition throughout. Monolayer articles of the invention may be produced using the OS composition alone, or using a blend of the OS composition with one or more additional polymers or ingredients.

A multilayer article may be produced that includes the OS composition in one or more layers. In some embodiments, a multilayer article may benefit from (i) placing one or more layers of another material between the atmosphere and the OS composition and/or (ii) placing one or more layers of another material between a packaged product and the OS composition. An outer layer of one or more layers may, for example, protect the OS composition from physical damage and assist in blocking or reducing migration of oxygen through a wall of the article. In such constructions, the OS composition will preferably scavenge any oxygen that penetrates the one or more layers located between the atmosphere and the OS composition. In addition, the OS composition is also preferably capable of scavenging oxygen that may be present inside a packaged product or within a headspace of the packaging article (if present).

The compatibility of the materials used is an important consideration for a multilayer article. If the materials are not compatible, the layers may separate or the material may appear cloudy or hazy. Layer separation could lead to failure of the article, decrease clarity even further, degrade the strength or resilience of the article, change the functionality, or lead to premature exhaustion of the OS composition. Appropriate adhesives or other materials may be used between layers to maintain article integrity, which may lead to increased costs, manufacturing challenges, and may impact recycling. Therefore, the layers are preferably compatible if a multilayer construction is employed. For example, polymers having similar physical properties such as a viscosity and glass-transition temperature ("$T_g$") may be used in conjunction with OS polymer.

The OS composition of the invention may be deployed neat to form an oxygen-scavenging layer of a monolayer or multilayer packaging article. Or, alternatively, prior to formation of the oxygen-scavenging layer of the packaging article, it can be blended with one more additional polymers or additives, which may, for example, reduce transportation and storage costs and/or help preserve the oxygen-scavenging capacity of the OS composition.

Articles of the invention can include any suitable amount of OS component. The amount of OS component included in such articles may vary depending upon a variety of considerations such as, for example, the presence of other oxygen-scavenging materials, the desired oxygen-scavenging properties of the article, and the desired article properties. In preferred embodiments, monolayer or multilayer articles of the invention preferably include at least about 0.1 wt-%, more preferably at least about 0.5 wt-%, and even more preferably at least about 1.0 wt-% of the OS polymer of the invention, based on the total weight of the monolayer or multilayer article. Preferably, the monolayer or multilayer articles include less than about 15 wt-%, more preferably less than about 10 wt-%, and even more preferably less than about 5 wt-% of the OS polymer of the invention, based on the total weight of the monolayer or multilayer article.

Articles containing the OS component and/or composition of the invention are preferably storage stable for a prolonged period of time (e.g., at least days, weeks, or months) under normal atmospheric conditions without exhibiting unsuitable degradation in oxygen-scavenging properties, thereby avoiding costly storage techniques frequently associated with certain oxygen-scavenging articles. For further discussion of methods for achieving such storage stability, see U.S. Pub. No. 20050181155 by Share et al., which is incorporated herein by reference.

In some embodiments, to preserve oxygen-scavenging capacity, the OS component invention is combined with oxidation catalyst just prior to, or during, formation of an oxygen-scavenging layer of a packaging article. Such a timing of oxidation catalyst addition may result in enhanced storage stability for OS components and/or compositions of the invention prior to article formation. For example, such OS components and/or compositions may be storage stable under normal atmospheric conditions (e.g., ambient temperature, ambient humidity, and/or atmospheric air) for a prolonged period of time (e.g., days, weeks, months, etc.) without exhibiting an unsuitable degradation in oxygen-scavenging capacity, thereby avoiding costly storage techniques (e.g., storage under nitrogen gas, refrigeration, desiccation, etc.) frequently associated with certain oxygen-scavenging materials.

In some embodiments, the OS composition of the invention may include two or more parts, in which one part includes the OS component and another part includes the oxidation catalyst. In one such embodiment, the composition is a blend of two or more types of particles (preferably thermoplastic particles such as thermoplastic pellets, flakes, powder, etc.) where (a) a first particle includes a blend of an OS polymer of the invention and an optional first polymer, (b) a second particle includes a blend of an oxidation catalyst and an optional second polymer, and (c) the optional polymers are the same or different. The first particle may include any suitable amount of transitional metal catalyst or complex, including, for example, from about 1,000 ppm to about 40,000 ppm, from 5,000 ppm to about 30,000 ppm, or from about 10,000 ppm to about 25,000 ppm, based on the total amount of transitional metal in the catalyst or complex present in the first particles relative to the total weight of the first particles. In some embodiments, the second particles may be free, or substantially free, of oxidation catalyst. The above first and second particles may be combined at any suitable time to form a blend. For example, the above first and second particles may be combined to form a blend that may be stored for a period of time (e.g., days, weeks, months, etc.) before forming an article that includes the blend. Alternatively, the above first and second particles may be combined to form a blend just prior to forming an article from the blend, such as, for example, in the feedthroat of an injection molding machine or extruder. Thus, in some embodiments, the OS composition may be provided as a two-part (or more) kit or system including the above first and second particles, where the above first and second particles are not (or substantially are not) in contact with other.

Any suitable methods may be used to form articles including the OS component and/or composition described herein. Some non-limiting examples of specific methods are provided below.

Monolayer and multilayer articles of the invention may be formed from compositions of the invention using any suitable method. Examples of suitable methods include extrusion processes (including, e.g., co-extrusion), injection processes (including, e.g., co-injection), application of liquid coating compositions to at least a portion of a substrate, or a combination thereof. One or more precursor or intermediate articles, such as for example a preform, may be formed in route to the finished article.

In certain embodiments, to facilitate incorporation of the oxygen-scavenging materials described herein into an article, solid thermoplastic particles (e.g., pellets, flakes, powder, etc.) are formed which include the OS component described herein. Such thermoplastic particles may be formed, for example, by melt blending the OS component with a thermoplastic polymer and/or an oxidation catalyst and pelletizing the resulting blend. In some embodiments, the thermoplastic particles may be formed from the OS polymer alone.

In one method, a multilayered article (e.g., a container) is prepared by: (i) providing a barrier layer blend material including the OS polymer and/or composition of the invention; (ii) providing one or more inner layer materials of suitable formable polymer and one or more outer layer materials of suitable formable polymer; (iii) co-injecting the barrier layer blend material and the one or more inner layer materials and one or more outer layer materials to form a multilayered preform; and (iv) heating and expanding the preform to form the article.

In an alternative method, a multilayered article (e.g., a container) is prepared by: (i) providing a barrier layer blend material including the OS polymer and/or composition of the invention; (ii) providing one or more inner layer materials of suitable formable polymer and one or more outer layer materials of suitable formable polymer; (iii) extruding a multilayer parison tube having one or more inner layers and one or more outer layers of suitable formable polymer and the barrier layer blend material; (iv) clamping the parison tube into a hollow cavity mold; (v) blowing the parison against the cavity; and (vi) trimming the molded article.

In yet an alternative method (the "over-injected parison" method), a multilayered article (e.g., a container) is prepared by: (i) providing a barrier layer blend material including the OS polymer and/or composition of the invention; (ii) providing one or more inner and one or more outer layer materials of suitable formable polymer; (iii) extruding a multilayer parison tube having one or more inner layers and one or more outer layers of a suitable formable polymer and the barrier layer blend material; (iv) injecting one or more additional layers of polymer over the parison; (v) clamping the over-injected parison tube into a hollow cavity mold; (vi) blowing the over-injected parison against the cavity; and (vii) optionally trimming the molded container.

In yet another method (called "IOI"), a multilayered article (e.g., a container) is prepared by: (i) providing a blend material of the invention; (ii) providing a material of a suitable formable polymer; (iii) injecting the blend material to form a preform; (iv) injecting a layer of formable polymer against the preform (e.g., on the outside surface); and (v) heating and expanding the preform to form an article.

Additional non-limiting embodiments of the invention are provided below.

Embodiment A: A composition, comprising:
a component that includes a cyclic oxygen-scavenging group that is a Diels-Alder reaction product of:
a ring of a conjugated diene component, the ring having at least two conjugated double bonds, and
a double or triple bond of an unsaturated component; and
at least about 10 ppm of an oxidation catalyst.

Embodiment B: An oxygen-scavenging composition comprising:
a polymer;
an oxygen-scavenging component having a cyclic or acyclic oxygen-scavenging group that includes at least one carbon-carbon double bond with a heat of hydrogenation at least about as high as the heat of hydrogenation of bicyclo[2.2.2] octene; and
an oxidation catalyst.

Embodiment C: An oxygen-scavenging composition comprising:
a polymer;
an oxygen-scavenging component having an oxygen-scavenging group that includes at least one ring having a carbon-carbon double bond with a heat of hydrogenation greater than that of cyclohexene; and
an oxidation catalyst.

Embodiment D: An oxygen-scavenging composition comprising:
a polymer;
an oxygen-scavenging component having an oxygen-scavenging group that includes an unsaturated bicyclic group, wherein the bicyclic group includes at least one double bond located between atoms of a ring; and
an oxidation catalyst.

Embodiment E: A method, comprising:
providing:
a conjugated diene component, and
an unsaturated component; and
forming a formable polymer that includes a cyclic oxygen-scavenging group that is a reaction product of the above components, wherein the cyclic group includes at least one ring having a double bond located between atoms of the ring.

Embodiment F: A method for forming an oxygen-scavenging polymer comprising:
reacting:
a conjugated diene component that includes a cyclic group having at least two conjugated double bonds, and
a polymer precursor having at least one double bond; and
forming a polymer that includes the above reaction product, wherein at least one condensation linkage group attaches the reaction product to another portion of the polymer.

Additional non-limiting embodiments 1-42:
1. The composition of embodiment A, wherein the conjugated diene component comprises a cyclopentadiene component.
2. The composition of embodiment A, further comprising a formable polymer.
3. The composition of embodiment A, wherein a formable polymer includes the component as a covalently attached subunit thereof.
4. The composition of embodiments A, B, C or D further comprising a carrier liquid.
5. A packaging article comprising a layer of the composition of embodiments A, B, C, or D.
6. The composition of embodiments B or C, wherein the heat of hydrogenation of the carbon-carbon double bond is at least about as high as that of bicyclo[2.2.1]heptene.
7. The composition of embodiments B, C or D, wherein the polymer comprises a formable polymer.
8. The composition of embodiments B, C or D, wherein the polymer comprises a formable polymer that includes the component.
9. The composition of embodiments A, B, C or D, wherein the component comprises a backbone or pendant group of a formable polymer.
10. The composition of embodiments B, C or D, wherein the polymer comprises one or more polyesters, copolyesters, polycarbonates, poly(ethylene oxides), poly(epsilon-caprolactams), thermoplastic fluoropolymers, polyurethanes, polyepoxides, polylactones, polymethyl methacrylates, polystyrenes, polyarylates, polyphenylene oxides, styrene/maleic anhydrides, polyoxymethylenes, polyamides, polyimides, polysulfones, polyaminoacids, polydimethylsiloxanes, polyolefins, vinyls, polyketones, mixtures thereof, or derivatives thereof.

11. The composition of embodiments B, C, or D, wherein the polymer comprises a polyester, a copolyester, or a combination thereof.

12. The composition of embodiment 11, wherein the polyester polymer comprises a polyethylene terephthalate.

13. The composition of embodiments A, B, C or D, wherein the oxidation catalyst comprises one or more transition metal complexes present in an amount of at least about 10 parts per million.

14. The composition of embodiments A, B, C or D, wherein the composition comprises at least about 25, 35, or 100 parts per million of the oxidation catalyst.

15. The composition of embodiments A, B, C or D, wherein the oxidation catalyst comprises a cobalt catalyst.

16. The composition of embodiments A, B, C or D, wherein the composition comprises a blend of particles and the oxygen-scavenging component and the catalyst are present, or substantially present, in separate particles.

17. The composition of embodiment 16, wherein one of the particles includes the oxygen-scavenging component and a first polymer and the other includes the catalyst and a second polymer, and wherein the first and second polymers are the same or different.

18. A monolayer or multilayer packaging article that includes the composition of any one of embodiments A-D or 1-17.

19. A method comprising combining the ingredients of any one of embodiments embodiments A-D or 1-17 to form an oxygen-scavenging composition.

20. A method comprising forming a packaging article that contains the composition of any one of embodiments A-D or 1-17.

21. The method of embodiment E, further comprising:
   reacting the conjugated diene and unsaturated components to produce a polymer precursor containing the cyclic oxygen-scavenging group; and
   forming the formable polymer from the polymer precursor.

22. The method of embodiment E, wherein a preformed formable polymer includes the unsaturated component.

23. The method of embodiment F, wherein a preformed formable polymer includes the diene component.

24. The method of embodiment E, wherein the cyclic oxygen-scavenging group is formed using a Diels Alder reaction.

25. The method of embodiment E, wherein the conjugated diene component comprises a cyclic group having at least two conjugated double bonds.

26. The method of embodiments E or F, wherein the conjugated diene component comprises a cyclopentadiene component.

27. The method of embodiments E or F, wherein the conjugated diene component comprises anthlacene, butadiene, cyclohexadiene, cyclopentadiene, furan, isoprene, methyl vinyl ketone, thiophene, or a mixture thereof.

28. The method of embodiment E, wherein the unsaturated component comprises a fatty acid, succinic anhydride derivative, or a mixture thereof.

29. The method of embodiment F, wherein the polymer precursor comprises a succinic anhydride derivative, a fatty acid, or a mixture thereof.

30. The method of embodiments 28 or 29, wherein the succinic anhydride derivative comprises octenyl succinic anhydride.

31. The method of embodiments E or F, wherein the polymer or formable polymer comprises a thermoplastic polymer.

32. The method of embodiments E or F, wherein the polymer or formable polymer comprises a polyester, a copolyester, or a mixture thereof.

33. The method of embodiment 32, wherein the polymer or formable polymer comprises a polyethylene terephthalate.

33. The method of embodiments E or F, wherein the polymer or formable polymer exhibits a number average molecular weight of greater than 2,600.

34. The method of embodiment E, wherein the double bond of the at least one ring comprises a carbon-carbon double bond.

35. The method of embodiments E or F, further comprising forming an oxygen-scavenging composition that includes the polymer or formable polymer and an oxidation catalyst.

36. The method of embodiment 35, wherein the oxidation catalyst comprises one or more transition metal complexes.

37. The method of embodiment 35, wherein the oxidation catalyst comprises a cobalt catalyst.

38. The method of any one of embodiments 35-37, wherein the oxidation catalyst is present in a concentration of at least about 10 ppm by weight or, alternatively, at least about 25 or 35 ppm by weight.

39. The method of any one of embodiments E, F or 21-34, farther comprising forming a packaging article that includes the polymer or formable polymer.

40. The method of embodiment 39, wherein the packaging article comprises a monolayer or multilayer bottle, cup, bowl, container, closure, film, wrap, liner, coating, tray, carton, bag, or portion thereof.

41. The method of embodiments E, F or 21-34, farther comprising forming solid thermoplastic particles that include the polymer or formable polymer.

42. The method of embodiment F, wherein the at least one condensation linkage group comprises an amide, carbonate, ester, ether, imide, urea, or urethane linkage group.

EXAMPLES

The invention is illustrated by the following examples. It is to be understood that in accordance with the scope and spirit of the invention as set forth herein. Unless otherwise indicated, all parts and percentages are by weight and all molecular weights are weight average molecular weight. Unless otherwise specified, all chemicals used are commercially available from, for example, Sigma-Aldrich, St. Louis, Mo.

Examples 1-3

Preparation of Polymer Precursors

Example 1

A polymer precursor containing a cyclic OS group in the form of a norbornene group was prepared as follows using 1.0 mole of trimethylol propane ("TMP") and 1.1 mole of cyclopentadiene-modified linseed oil fatty acid:

To a 4-neck round-bottom flask equipped with a mechanical stirrer, a packed column, Dean-Starke trap, condenser, and a thermocouple connected to a temperature control device, were added 405 parts of cyclopentadiene-modified linseed oil fatty acid (a Diels-Alder reaction product of cyclopentadiene and linseed oil fatty acids), 95 parts of TMP, and 0.5 parts of FASCAT 4201 (a dibutyltin oxide catalyst commercially available from Atofina). The mixture was heated to 210° C. over the course of about 70 minutes. After heating the mixture for an additional 4 hours, the mixture had an acid number of 0.8 and a hydroxyl number of 146. The mixture was then cooled and discharged from the flask.

Example 2

A polymer precursor containing a cyclic OS group in the form of a norbornene group was prepared as follows using 1.0 mole of pentaerythritol and 2.1 mole of cyclopentadiene-modified linseed oil fatty acid:

To a 4-neck round-bottom flask equipped with a mechanical stirrer, a packed column, Dean-Starke trap, condenser, and a thermocouple connected to a temperature control device, were added 1981.8 parts of dicyclopentadiene-modified linseed oil fatty acid (a Diels-Alder reaction product of dicyclopentadiene and linseed oil fatty acids), 274.4 parts pentaerythritol, and 2.2 parts FASCAT 4201. The mixture was heated to 210° C. over the course of about 3 hours. After heating the mixture for an additional 2 hours, the mixture had an acid number of 2 and a hydroxyl number of 90. The mixture was then cooled and discharged from the flask.

Example 3

A polymer precursor containing a cyclic OS group in the form of a norbornene group was prepared as follows using 2 moles of ethylene glycol and 1 mole of a Diels-Alder reaction product of cyclopentadiene and octenylsuccinic anhydride (referred hereinafter as "cyclopentadiene adduct of OSA"):

To a 4-neck round-bottom flask equipped with a mechanical stirrer, a packed column, Dean-Starke trap, condenser, and a thermocouple connected to a temperature control device, were added 372.5 parts of cyclopentadiene adduct of OSA, 127.5 parts of ethylene glycol, and 0.5 grams of FASCAT 4201. This mixture was heated to 220° C. over the course of about 2.5 hours. After 4 hours total at 220° C., the mixture had an acid number of 2.4 and a hydroxyl number of 179. The mixture was cooled and discharged at 150° C. from the flask.

Examples 4-8

Preparation of Polyester OS Polymers

Example 4

To a 4-neck round-bottom flask equipped with a mechanical stirrer, a packed column, Dean-Starke trap, condenser, and a thermocouple connected to a temperature control device, were added 435.5 parts of the polymer precursor of Example 1 and 64.5 parts of adipic acid. The mixture was heated to 210° C. over the course of about 2.5 hours. After 5 hours total at 210° C., the mixture had an acid number of 2.4 and a hydroxyl number of 31.5. The mixture was then cooled and discharged at 150° C. from the flask.

Example 5

To a 4-neck round-bottom flask equipped with a mechanical stirrer, a packed column, Dean-Starke trap, condenser, and a thermocouple connected to a temperature control device, were added 428 parts of the polymer precursor of Example 1 and 72 parts of adipic acid. The mixture was heated to 210° C. over the course of about 1.5 hours. The temperature of the mixture was raised to 220° C. and held for about 5.5 hours—at which point the mixture had an acid number of 1.8 and a hydroxyl number of 26.2. The mixture was cooled and discharged at 150° C. from the flask.

Example 6

To a 4-neck round-bottom flask equipped with a mechanical stirrer, a packed column, Dean-Starke trap, condenser, and a thermocouple connected to a temperature control device, were added 460.5 parts of the polymer precursor of Example 2 and 39.5 parts of adipic acid. This mixture was heated to 210° C. over the course of about 1.5 hours. The temperature of the mixture was raised to 220° C. After about 2 hours total at 220° C., the mixture had an acid number of 2.1 and a hydroxyl number of 19.4. The mixture was cooled and discharged at 150° C. from the flask.

Example 7

To a 4-neck round-bottom flask equipped with a mechanical stirrer, a packed column, Dean-Starke trap, condenser, and a thermocouple connected to a temperature control device, were added 455.5 parts of polymer precursor of Example 2 and 44.5 parts of isophthalic acid. This mixture was heated to 220° C. over the course of about 1.5 hours. After about 6.5 hours total at 220° C., the mixture had an acid number of 2.9 and a hydroxyl number of 23.2. The mixture was then cooled and discharged at 150° C. from the flask.

Example 8

To a 4-neck round-bottom flask equipped with a mechanical stirrer, a packed column, Dean-Starke trap, condenser, and a thermocouple connected to a temperature control device, were added 400 parts of the polymer precursor of Example 3 and 78.5 parts of adipic acid. This mixture was heated to 220° C. over the course of about 2.5 hours. After about 3 hours total at 220° C., the mixture had an acid number of 4.0. The mixture was then cooled and discharged at 150° C. from the flask.

Oxygen Scavenging Properties of the Polyester OS Polymers of Examples 4-8

A sample of 150 milligrams ("mg") of each of the polymer compositions of Examples 4-8 was mixed with 1,000 ppm of cobalt catalyst (6% w/w Cobalt Ten-Cex). The samples were each sealed in a 6 ml glass airtight vial containing ambient atmospheric air (i.e., about 21% oxygen). After 16 hours at ambient temperature, the amount of residual oxygen in the vials was measured using an Ocean Optics Foxy Oxygen Sensor System (available from Ocean Optics of Dunedin, Fla.), which uses fluorescence quenching to measure oxygen content. The results were measured after 2 minutes of exposure to the sensor. The results are provided below in Table 2.

TABLE 2

| Material | % Residual Oxygen at 16 Hours | | |
|---|---|---|---|
|  | Vial 1 | Vial 2 | Mean |
| Example 4 | 0.9 | 1.7 | 1.3 |
| Example 5 | 2.2 | 2 | 2.1 |
| Example 6 | 2.2 | 0.6 | 1.4 |
| Example 7 | 2.4 | 4.1 | 3.3 |
| Example 8 | 1.2 | 2 | 1.6 |
| C1* | 22 | 21.3 | 21.7 |

*An empty control vial containing only atmospheric air was included as a negative control.

As shown in Table 2, good oxygen scavenging was observed for the compositions of Examples 4-8, which each included cyclic OS groups in the form of norbornene groups.

Example 9

In the following example, an oxygen scavenging polymer is produced by first making an unsaturated polyester and then reacting carbon-carbon double bonds of the polyester with cyclopentadiene.

Example 9.1

To a 4-neck round-bottom flask equipped with a mechanical stirrer, Dean-Starke trap, condenser, and a thermocouple connected to a temperature control device, were added 4839.6 parts of linseed oil fatty acid, 1160.4 parts pentaerythritol, and 6.0 parts FASCAT 4201 catalyst. The mixture was heated to 170° C. over the course of about 3 hours. After heating slowly to 200° C. and holding for 2 hours, the mixture had an acid number of 1.0 and a hydroxyl number of 157. The mixture was then cooled and discharged from the flask. 287 parts of water were collected.

Example 9.2

To a 4-neck round-bottom flask equipped with a mechanical stirrer, Dean-Starke trap, condenser, and a thermocouple connected to a temperature control device, were added 2281.2 parts of the adduct of Example 9.1 and 317 parts adipic acid. The mixture was heated to 210° C. over the course of about 6 hours. After holding for 4 hours, the mixture had an acid number of 2.4 and a hydroxyl number of 47.9. The mixture was then cooled and filtered through a 25 micron bag. 65 parts of water were collected.

Example 9.3

73.3 parts of the polymer prepared in Example 9.2 were placed in a Parr reactor with 26.7 parts of dicyclopentadiene. The reactor was heated to 240° C. over the course of 1 hour, and the pressure reached 50 psi (345 kPa). The reactor was held at 240° C. for 1 hour as the pressure became constant at 20 psi (138 kPa). The reactor was then vented and sparged with nitrogen for 1 hour, followed by vacuum at 29 inches of Hg (98.2 kPa) while holding at 240° C. The batch was then cooled and discharged.

Oxygen Scavenging Properties of the OS Polyester Polymer of Example 9

The oxygen-scavenging ability of the polyester polymer of Example 9 was assessed using the same methodology as described above for Examples 4-8, with the exception that a 200±20 mg sample of polymer was tested.

TABLE 3

| Material | % Residual Oxygen at 16 Hours | | | |
|---|---|---|---|---|
| | Vial 1 | Vial 2 | Vial 3 | Mean |
| Example 4 | 2.2 | 1.0 | 0.0 | 1.1 |
| Example 9 Run 1 | 3.3 | 2.3 | 2.5 | 2.7 |
| Example 9 Run 2 | 1.6 | 5.1 | 4.1 | 3.6 |
| C2* | 20.8 | 21.5 | 21.4 | 21.2 |

*An empty control vial containing only atmospheric air was included as a negative control. Theoretical oxygen concentration is 20.9%.

As shown in Table 3, good oxygen scavenging was observed for a composition including the polyester polymer of Example 9 (which is believed to include cyclic OS groups in the form of norbornene groups).

Example 10

Articles

A monolayer 23 gram 20-ounce bottle with a 28 mm finish and 8-10 mil side wall was prepared as follows. A blend containing 1,000 ppm of cobalt neodecanoate, 1% of DILULIN product (a Diels-Alder reaction product of linseed oil and cyclopentadiene commercially available from Cargill as an accelerator for drying oil coatings), and 99% of dried Kosa 1101 PET (available from Invista and pre-dried in a 260° C. oven for about 6 hours) was prepared by blending the materials in an impermeable foil-lined bag. The blend was then fed directly into the feedthroat of an injection molding machine and injection molded into performs at about 270-290° C. Within about a day, the preforms were blow molded the aforementioned bottles using a preform temperature of about 95-105° C.

The oxygen transmission properties of the bottles were analyzed using a Mocon Oxtran 2-61 system (available from Modem Controls) adapted for use with such bottles. Prior to analysis, the bottles conditioned for 48 hours in a 10 cc/min (cubic centimeters per 10 minute) flow of carrier gas (98% nitrogen and 2% hydrogen). After the conditioning period, the oxygen concentration in the carrier gas was measured at 10-minute intervals for 20 cycles to determine the oxygen transmission rate in cubic centimeters of oxygen per package per day ("cc/package/day"). The tests were carried out under conditions of ambient temperature and humidity. The results are provided below in Table 4.

TABLE 4

| Example | Bottle 1 (cc $O_2$/package/day) | Bottle 2 (cc $O_2$/package/day) | Mean (cc $O_2$/package/day) |
|---|---|---|---|
| 10 | 0.0011 | 0.0001 | 0.0006 |
| C3* | 0.0661 | — | 0.0661 |

*A 500 ml PET control bottle formed from neat KOSA 1101 PET.

The data in Table 4 shows that the bottles containing 1 wt-% of the DILULIN product exhibited excellent oxygen barrier properties—exhibiting a mean oxygen transmission rate that was about 100 times less than the PET control bottle.

Example 11

Articles

Monolayer 24 gram 300 ml PET beer bottles were blow-molded from preforms containing varying levels of the oxygen-scavenging polyester polymer of Example 6. The bottles were filled with nitrogen-sparged water and sealed with a glass slide using an epoxy adhesive. The oxygen concentration inside the bottles stored under ambient conditions was measured over time using an OXYSENSE oxygen testing unit. The data is reported below in Table 5 for PET control bottles (i.e., 100 wt-% PET) and PET bottles containing 0.3 wt-%, 0.45 wt-%, and 0.6 wt-% of the polyester polymer of Example 6 and a suitable amount of oxidation catalyst.

TABLE 5

| | Total Parts Oxygen (parts per billion) | | | |
|---|---|---|---|---|
| | PET Control | | Ex. 11 Bottles | |
| Time (elapsed days) | Bottle (100 wt-%) | 0.3 wt-% Ex. 6 | 0.45 wt-% Ex. 6 | 0.6 wt-% Ex. 6 |
| 1 | 291 | 90 | 93 | 96 |
| 4 | 571 | — | 66 | 167 |
| 6 | 708 | — | 65 | 151 |
| 8 | 830 | — | 60 | 77 |
| 11 | 980 | 108 | — | 72 |
| 21 | 1507 | 166 | — | 62 |
| 28 | 1874 | 391 | 80 | 61 |
| 35 | 2362 | 668 | 182 | 59 |

The data in Table 5 shows that the bottles containing the various concentrations of the polyester polymer of Example 6 all exhibited excellent oxygen barrier properties.

Examples 12 and 13

Articles

A first blend was produced, via compounding in a Werner and Pfleiderer twin-screw extruder, from the following composition: 28.3 wt-% KOSA 1101 PET; 28.3 wt-% Eastar 6753 PET copolyester; 28.3 wt-% Dynapol P1500HV polyester (Degussa); and 15.0 wt-% oxygen-scavenging polyester of Example 6. A cobalt neodecanoate blend was formed by compounding cobalt neodecanoate in the same manner with KOSA 1101 PET to produce a composition including 99.25 wt-% KOSA 1101 PET and 0.75 wt-% cobalt neodecanoate (20.5 wt-% cobalt metal content). A cobalt acetate blend was also formed by compounding cobalt acetate with KOSA 1101 PET to produce a composition including 99.35 wt-% KOSA 1101 PET and 0.65 wt-% cobalt acetate (23.6 wt-% cobalt metal content).

These materials were then incorporated into 27.8 gram PET preforms by addition through the feedthroat of the injection screw in the following ratios: Example 12 preforms: 92wt-% KOSA 1101 PET, 4wt-% of the first blend, and 4 wt-% of the cobalt neodecanoate blend; Example 13 preforms: 92% wt-% KOSA 1101 PET, 4 wt-% of the first blend, and 4 wt-% of the cobalt acetate blend.

The preforms were subsequently blowmolded into 550 ml monolayer juice bottles. The oxygen barrier properties of bottles formed from the performs of Examples 12 and 13 was assessed using the methodology described above in Example 11, with the resulting data presented below in Table 6.

TABLE 6

| | Total Parts Oxygen (parts per billion) | | |
|---|---|---|---|
| Time (elapsed days) | PET Control* | Example 12 | Example 13 |
| 0 | 52 | 68 | 97.5 |
| 17 | 1170.5 | 51 | 37 |
| 24 | 1591 | 56.5 | 43.5 |
| 33 | 2069 | 56.5 | 45.5 |
| 40 | 2404 | 58 | 48.5 |
| 54 | 2963.5 | 61.5 | 64 |
| 66 | 3442 | 166.5 | 174 |

*A 550 ml PET control bottle formed from neat KOSA 1101 PET.

It is clear from the data in Table 6 that a variety of counterions may be utilized in conjunction with the cobalt ion to effectively catalyze the scavenging reaction with oxygen.

The complete disclosure of all patents, patent applications, and publications, and electronically available material cited herein are incorporated by reference. The foregoing detailed description and examples have been given for clarity of understanding only. No unnecessary limitations are to be understood therefrom. The invention is not limited to the exact details shown and described, for variations obvious to one skilled in the art will be included within the invention defined by the claims.

What is claimed is:

1. A composition, comprising:
    a thermoplastic polymer;
    an oxygen-scavenging polymer comprising a condensation polymer having an unsaturated bicyclic group; and
    an oxidation catalyst.
2. The composition of claim 1, wherein the bicyclic group includes at least one double bond located between atoms of a ring.
3. The composition of claim 1, wherein the bicyclic group comprises a structure represented by the nomenclature expression:

bicyclo [x,y,z]alkene wherein:
    x is 2 or more, and
    y and z are each at least 1.
4. The composition of claim 3, wherein:
    x is 2 or 3, and
    y and z are independently 1 or 2.
5. The composition of claim 1, wherein the bicyclic group comprises bicyclo[2.1.1]hexene, bicyclo[2.2.1]heptene, bicyclo[2.2.1]heptadiene, bicyclo[2.2.2]octene, bicyclo[2.2.2]octadiene, or a mixture thereof.
6. The composition of claim 1, wherein the condensation polymer includes both condensation and addition linkages or segments.
7. The composition of claim 1, wherein the condensation polymer comprises a thermoplastic polymer.
8. The composition of claim 1, wherein the condensation polymer comprises one or more polyester, copolyester, polycarbonate, poly(ethylene oxide), poly(epsilon- caprolactam), polyurethane, polyepoxide, polylactone, polyoxymethylene, polyamide, polyimide, polysulfone, polyaminoacid, polydimethylsiloxane, derivative thereof, or mixture thereof.
9. The composition of claim 1, wherein the condensation polymer comprises a polyester polymer, a copolyester polymer, or a combination thereof.
10. The composition of claim 9, wherein the condensation polymer comprises a polyethylene terephthalate.
11. The composition of claim 1, wherein a pair of condensation linkages attach a polymer precursor including the bicyclic group to a backbone of the oxygen- scavenging polymer.
12. The composition of claim 1, wherein the unsaturated bicyclic group is present in a condensation monomer.
13. The composition of claim 1, wherein the composition comprises at least about 25 parts per million of the oxidation catalyst.
14. The composition of claim 1, wherein the oxidation catalyst comprises one or more transition metals, transition metal complexes, or mixtures thereof.
15. The composition of claim 1, wherein the oxidation catalyst comprises a cobalt catalyst.
16. The composition of claim 15, wherein:
    the oxygen-scavenging polymer comprises a polyester polymer and the composition includes at least 1% by weight of the oxygen-scavenging polyester polymer; and the composition includes at least 25 ppm of the oxidation catalyst.

17. The composition of claim 16, wherein the unsaturated bicyclic group is present in a structural unit derived from an unsaturated fatty acid or unsaturated succinic anhydride derivative.

18. The composition of claim 1, wherein the composition is a melt blend.

19. The composition of claim 1, wherein the composition is in the form of solid thermoplastic particles.

20. A composition, comprising:
a thermoplastic polymer;
a component that includes an unsaturated bicyclic oxygen-scavenging group that is a Diels-Alder reaction product of:
  a ring of a conjugated diene component, the ring having at least two conjugated double bonds, and
  a double or triple bond of an unsaturated component, wherein the unsaturated component comprises an acid, or anhydride or easter thereof, an alcohol, an amine, an isocyanate, a thiol, or a combination thereof; and
at least about 10 ppm of an oxidation catalyst.

21. The composition of claim 20, wherein the component comprises a formable condensation polymer that includes the bicyclic oxygen-scavenging group.

22. An oxygen-scavenging composition comprising:
a thermoplastic polymer;
a condensation polymer having an oxygen-scavenging bicyclic group that includes at least one carbon-carbon double bond with a heat of hydrogenation at least about as high as the heat of hydrogenation of bicyclo[2.2.1]heptene; and
an oxidation catalyst.

* * * * *